United States Patent [19]

Michaelis

[11] Patent Number: 5,077,321

[45] Date of Patent: Dec. 31, 1991

[54] PROCESS FOR THE PREPARATION OF POLYURETHANE SUBSTANCES USING SPECIFIC STABILIZER SYSTEMS

[75] Inventor: Peter Michaelis, Freiburg, Fed. Rep. of Germany

[73] Assignee: Ciba-Geigy Corporation, Ardsley, N.Y.

[21] Appl. No.: 709,689

[22] Filed: Jun. 3, 1991

[30] Foreign Application Priority Data

Jun. 7, 1990 [CH] Switzerland .................. 1906/90

[51] Int. Cl.$^5$ .................. C08J 9/00; C08G 18/32
[52] U.S. Cl. .................. 521/117; 521/174; 521/177; 528/49; 528/74; 528/79
[58] Field of Search .................. 521/117, 174, 177; 528/49, 74, 79

[56] References Cited

U.S. PATENT DOCUMENTS

| | | | |
|---|---|---|---|
| 3,280,049 | 10/1966 | Hyre et al. | 521/117 |
| 3,494,880 | 2/1970 | Austin | 521/174 |
| 4,007,234 | 2/1977 | Schuddemage et al. | 525/243 |
| 4,021,385 | 5/1977 | Austin et al. | 521/174 |
| 4,046,742 | 9/1977 | Eimers et al. | 521/129 |
| 4,070,304 | 1/1978 | Hinze | 252/404 |
| 4,128,532 | 12/1978 | Eimers et al. | 521/171 |
| 4,177,332 | 12/1979 | Mitschke et al. | 521/131 |
| 4,248,930 | 2/1981 | Haas | 428/319.7 |
| 4,265,783 | 5/1981 | Hinze | 252/182.27 |
| 4,275,173 | 6/1981 | Hinze | 521/117 |
| 4,483,974 | 11/1984 | Grögler et al. | 521/51 |

Primary Examiner—Morton Foelak
Attorney, Agent, or Firm—Luther A. R. Hall

[57] ABSTRACT

A process for the preparation of polyurethane substances in any desired form by reaction of
a) polyisocyanates with
b) compounds comprising at least two hydrogen atoms that are reactive towards isocyanates, in the presence of
c) catalysts known per se and
d) specific stabilizer systems, wherein there is used as component d) a stabilizer system comprising at least two compounds of at least two structurally different stabilizer types of formulae (1), (2), (3) and (4), in which formula (1) represents formulae (1a), (1b), (1c), (1d) or (1e)

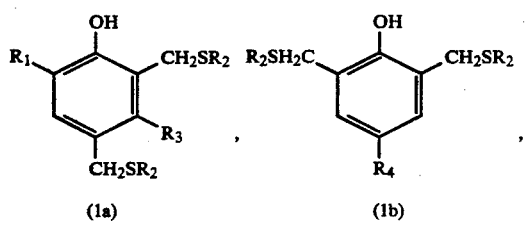

(1a)     (1b)

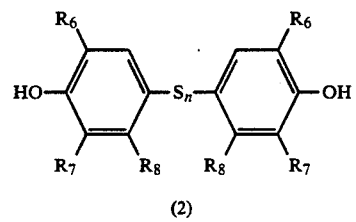

(1c)     (1d)

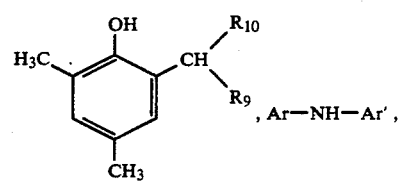

(1e)

and the other formulae (2), (3) and (4) are as follows:

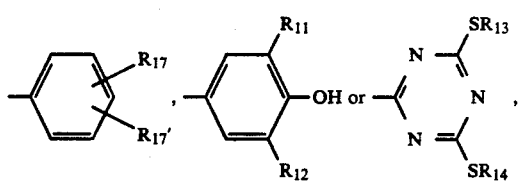

(2)

(3)     (4)

wherein $R_1$ each independently of the other is $C_1$-$C_4$alkyl, $R_2$ and $R_5$ each independently of the other are $C_1$-$C_{18}$alkyl, $C_5$-$C_7$cycloalkyl, benzyl, phenyl or a group of the formula —$CH_2COO$—$C_6$-$C_{18}$alkyl, $R_3$ is —H or —$CH_3$, and $R_4$ is $C_1$-$C_{12}$alkyl, $R_6$ and $R_8$ each independently of the other are $C_1$-$C_{18}$alkyl or $C_5$-$C_7$cycloalkyl, $R_7$ each independently of the other is —H, $C_1$-$C_4$alkyl or $C_5$-$C_7$cycloalkyl, n is the number 1, 2 or 3, $R_9$ is $C_6$-$C_{18}$alkyl and $R_{10}$ is methyl or ethyl, and Ar and Ar' ech independently of the other are a radical of the formula or Ar—NH—Ar' is a radical of the formula (Abstract continued on next page.)

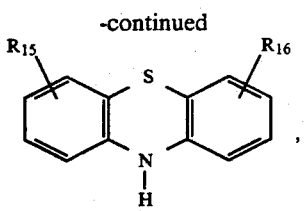
wherein $R_{17}$ and $R_{17}'$ each independently of the other are —H or $C_4$–$C_{18}$alkyl, $R_{11}$ and $R_{12}$ each independently of the other are $C_1$–$C_4$alkyl, $R_{13}$ and $R_{14}$ each independently of the other are $C_4$–$C_{18}$alkyl, and $R_{15}$ and $R_{16}$ each independently of the other are —H or $C_1$–$C_{12}$alkyl.

PROCESS FOR THE PREPARATION OF POLYURETHANE SUBSTANCES USING SPECIFIC STABILIZER SYSTEMS

The present invention relates to a process for the preparation of polyurethane substances in any desired form using stabiliser systems comprising at least two compounds of at least two structurally different specific stabiliser types, and to the use of those systems as stabilisers in the preparation of polyurethanes and for the polyols required therefor.

Polyurethanes are a comprehensive group of polymers of very varied composition having a broad spectrum of properties and are well known as mass products in a variety of fields of application, polyurethane foams having become particularly prominent. Polyurethanes have been used in a wide range of areas, for example in the furniture, automobile and textile fields and in the packaging, household, sound-insulation and heat-insulation sectors.

Polyurethane substances are obtained on an industrial scale by reaction of di- or poly-isocyanates with di- or poly-hydroxy compounds with the concomitant use of stabilisers and other additives known per se, optionally of blowing agents. They are often prepared from two-component systems, one component being the hydroxy compound, including all the auxiliaries required for processing, such as catalysts, stabilisers, flame-retardants, emulsifiers, and optionally, blowing agents, and the second component being the isocyanate.

Anti-oxidants play an important role as stabilisers used in the preparation of polyurethanes, being used especially for stabilising polyols, which are susceptible to oxidation, and/or for preventing so-called core discolouration/scorching in the preparation of foams. Anti-oxidants that are often proposed include, for example, alkylated anilines, phosphites, sulfides, thioethers or sterically hindered phenols, such as, especially, 2,6-di-tert-butyl-4-methylphenol. Combinations of specific anti-oxidants have also been proposed, such as mixtures of sterically hindered phenols (see, for example, U.S. Pat. No. 3,280,049, U.S. Pat. No. 4,007,234, U.S. Pat. No. 4,494,880), or mixtures of sterically hindered phenols with specific diphenylamines (see, for example, U.S. Pat. No. 4,070,304, U.S. Pat. No. 4,265,783, U.S. Pat. No. 4,275,173 and U.S. Pat. No. 4,021,385). The stabilisers and/or mixtures of stabilisers proposed in those specifications do not, however, meet the stringent demands made on them in practice.

It has now been found that mixtures of specific stabiliser types are outstandingly suitable as anti-oxidants in the preparation of polyurethane substances in any desired form, especially foams.

The present invention accordingly relates to a process for the preparation of polyurethane substances by reaction of
a) polyisocyanates with
b) compounds comprising at least two hydrogen atoms that are reactive towards isocyanates, in the presence of
c) catalysts known per se and
d) specific stabiliser systems,
wherein there is used as component d) a stabiliser system comprising at least two compounds of at least two structually different stabiliser types of formulae (1), (2), (3) and (4), in which formula (1) represents formulae (1a), (1b), (1c), (1d) or (1e)

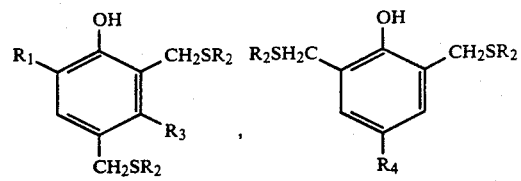

(1a)  (1b)

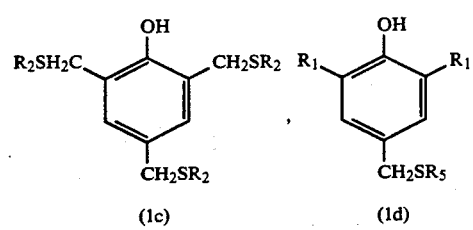

(1c)  (1d)

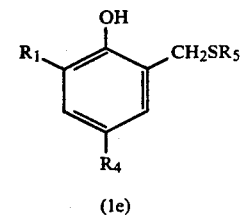

(1e)

and the other formulae (2), (3) and (4) are as follows:

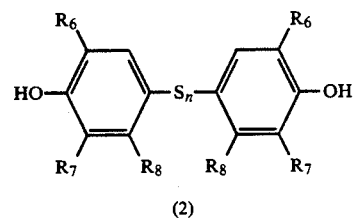

(2)

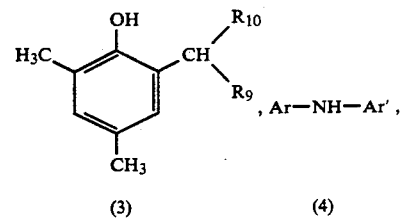

(3)  (4)

wherein $R_1$ each independently of the other is $C_1$–$C_4$alkyl, $R_2$ and $R_5$ each independently of the other are $C_1$–$C_{18}$alkyl, $C_5$–$C_7$cycloalkyl, benzyl, phenyl or a group of the formula —$CH_2COO$—$C_6$–$C_{18}$alkyl, $R_3$ is —H or —$CH_3$, and $R_4$ is $C_1$–$C_{12}$alkyl, $R_6$ and $R_8$ each independently of the other are $C_1$–$C_{18}$alkyl or $C_5$–$C_7$cycloalkyl, $R_7$ each independently of the other is —H, $C_1$–$C_4$alkyl or $C_5$–$C_7$cycloalkyl, n is the number 1, 2 or 3, $R_9$ is $C_6$–$C_{18}$alkyl and $R_{10}$ is methyl or ethyl, and Ar and Ar' each independently of the other are a radical of the formula

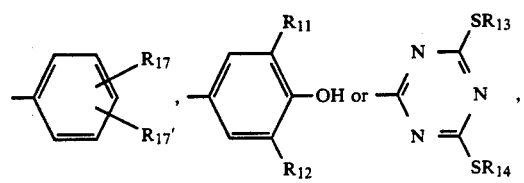

-continued
or Ar—NH—Ar' is a radical of the formula

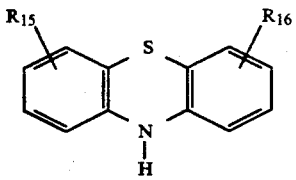

wherein $R_{17}$ and $R_{17}'$ each independently of the other are —H or $C_4$–$C_{18}$alkyl, $R_{11}$ and $R_{12}$ each independently of the other are $C_1$–$C_4$alkyl, $R_{13}$ and $R_{14}$ each independently of the other are $C_4$–$C_{18}$alkyl, and $R_{15}$ and $R_{16}$ each independently of the other are —H or $C_1$–$C_{12}$alkyl.

$C_1$–$C_4$alkyl in the above substituents is, for example, methyl, ethyl, n-propyl, isopropyl, n-butyl, sec-butyl or tert-butyl.

$C_1$–$C_{18}$alkyl in the above substituents may be straight-chain or branched and is, for example, methyl, ethyl, n-propyl, isopropyl, n-butyl, sec-butyl, tert-butyl, n-pentyl, tert-pentyl, n-hexyl, n-octyl, 2-ethylhexyl, n-decyl, 1,1,3,3-tetramethylbutyl, 1,1,3,3-tetramethylhexyl, n-undecyl, n-dodecyl or 1,1,3,3,5,5-hexamethylhexyl, n-tridecyl, n-tetradecyl, n-hexadecyl and n-octadecyl.

$R_4$, $R_{15}$ and $R_{16}$ as $C_1$–$C_{12}$alkyl may be straight-chain or branched and are, for example, methyl, ethyl, n-propyl, isopropyl, n-butyl, sec-butyl, tert-butyl, n-pentyl, tert-pentyl, n-hexyl and the corresponding examples given above for $C_1$–$C_{18}$alkyl.

$C_6$–$C_{18}$alkyl as $R_9$ or in the group of the formula —CH$_2$COO—$C_6$–$C_{18}$alkyl may be straight-chain or branched and is, for example, n-octyl, isooctyl, n-decyl, n-dodecyl, n-tridecyl, n-tetradecyl, 1,1,3,3-tetramethyloctyl, 2-ethylhexyl, 1,1,3,3,5,5-hexamethyldecyl, 1,1,5,5,9,9-hexamethyldecyl, n-hexadecyl and n-octadecyl. Preference is given to n-octyl, n-dodecyl, n-tridecyl, n-tetradecyl, n-hexadecyl and n-octadecyl.

$R_{13}$, $R_{14}$, $R_{17}$ and $R_{17}'$ as $C_4$–$C_{18}$alkyl may be straight-chain or branched and have, for example, the same meaning as that given above for $C_6$–$C_{18}$, or may be n-butyl, sec-butyl, tert-butyl, n-pentyl or tert-pentyl.

$C_5$–$C_7$cycloalkyl in the above substituents is, for example, cyclopentyl and, especially, cyclohexyl.

$R_2$ is preferably $C_8$–$C_{12}$alkyl.

$R_6$ and $R_8$ are preferably $C_1$–$C_{12}$alkyl and, more especially, $C_1$–$C_4$alkyl.

$R_7$ is preferably —H, $R_8$ is preferably —CH$_3$.

$R_{10}$ is preferably methyl.

In formula (2), n is preferably the number 1.

The compounds of formulae 1a to 1e, 2, 3 and 4 are known compounds, and can be prepared by means of processes known per se.

The following substances may be mentioned as examples of representatives of compounds of formula Ia:
2,4-bis(n-octylthiomethyl)-6-methyl-phenol, 2,4-bis(tert-octylthiomethyl)-6-methyl-phenol, 2,4-bis(tert-dodecylthiomethyl)-6-methyl-phenol, 2,4-bis(n-octylthiomethyl)-3,6-dimethyl-phenol, 2,4-bis(n-octylthiomethyl)-6-tert-butyl-phenol, 2,4-bis(n-dodecylthiomethyl)-6-tert-butyl-phenol, 2,4bis(n-octylthiomethyl)-6-tert-butyl-3-methyl-phenol and 2,4-bis(n-dodecylthiomethyl)-6-tert-butyl-3-methyl-phenol, or mixtures thereof.

According to the invention, in formula 1a $R_1$ is preferably tert-butyl or especially —CH$_3$, $R_2$ is preferably octyl and $R_3$ is preferably —CH$_3$ and especially —H. Octyl is n-octyl or branched octyl. Special preference is given to 2,4-bis(n-octylthiomethyl)-6-methyl-phenol.

In formula 1b, $R_2$ is preferably straight-chain or branched $C_8$–$C_{12}$alkyl and $R_4$ is preferably straight-chain or branched nonyl.

According to the invention, each $R_2$ in formula 1c, independently of the others, is preferably straight-chain or branched $C_8$–$C_{12}$alkyl.

In formula 1d, $R_1$ is preferably tert-butyl and $R_5$ is preferably straight-chain or branched octyl.

In formula 2, substituents having identical indices are preferably identical. $R_7$ is preferably —H and $R_8$ is preferably —CH$_3$; more especially, $R_6$ is $C_1$–$C_4$alkyl, $R_7$ is —H, $R_8$ is methyl and n is the number 1.

$R_9$ in formula 3 is preferably straight-chain or branched $C_{14}$alkyl or $C_{16}$alkyl.

Formula 4 preferably corresponds to the following formulae

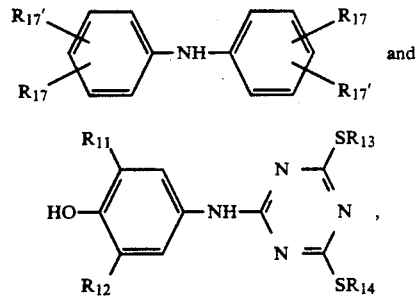

wherein $R_{17}$ and $R_{17}'$ are identical or different and are $C_4$–$C_8$alkyl, $R_{11}$ and $R_{12}$ are tert-butyl and $R_{13}$ and $R_{14}$ are straight-chain or branched octyl. The two groups $R_{17}$ and $R_{17}'$ each independently of the other are most preferably tert-butyl and/or tert-octyl.

Stabiliser systems that are preferred according to the invention comprise at least two compounds of two stabiliser types of formulae 1a and 2, 1a and 4, or 2 and 4, especially of formulae 1a and 2, or 2 and 4.

The ratio of the different components in the stabiliser mixture can be varied as desired. The ratio is preferably so adjusted that the mixtures are liquid. If one or more components of the mixture is/are solid, it is advantageous to use a sufficient amount of at least one liquid component for the solid components to be present in solution in the mixture.

Examples of the ratio of the two stabiliser components are from 9:1 to 1:9, especially from 1:4 to 4:1, more especially from 1:3 to 3:1. In the case of multi-component stabiliser systems those limits apply analogously.

In the preparation of the polyurethanes, it is especially advantageous to incorporate the stabiliser systems in component b).

The concentration of the stabiliser mixtures according to this Application in the components a) or b) in question can vary as desired; for component b) it is advantageously from 0.01 to 1% by weight, preferably from 0.2 to 0.6% by weight, based on the polyol (component b).

The invention relates also to stabilised compositions comprising

A) a polyurethane substance and

B) a stabiliser system comprising at least two compounds of at least two structurally different stabiliser types of formulae 1, 2, 3 and 4 as defined above.

Suitable polyurethanes according to the invention are two-component systems comprising polyisocyanates and compounds comprising at least two hydrogen atoms that are reactive towards isocyanates.

Polyisocyanates (component a) that are suitable for use in accordance with the invention are aliphatic, cycloaliphatic, araliphatic, aromatic and heterocyclic polyisocyanates, for example ethylene diisocyanate, 1,4-tetramethylene diisocyanate, 1,6-hexamethylene diisocyanate, 1,12-dodecane diisocyanate, cyclobutane-1,3-diisocyanate, cyclohexane-1,3- and -1,4-diisocyanate and any desired mixtures of those isomers, 1-isocyanato-3,3,5-trimethyl-5-isocyanatomethylcyclohexane, 2,4- and 2,6-hexahydrotolylene diisocyanate and any desired mixtures of those isomers, hexahydro-1,3- and/or -1,4-phenylene diisocyanate, perhydro-2,4'- and/or -4,4'-diphenylmethane diisocyanate, 1,3- and 1,4-phenylene diisocyanate, 2,4- and 2,6-tolylene diisocyanate and any desired mixtures of those isomers, diphenylmethane-2,4'- and/or -4,4'-diisocyanate, naphthylene-1,5-diisocyanate, triphenylmethane-4,4',4"-triisocyanate, polyphenyl-polymethylene polyisocyanates, such as those obtained by means of aniline-formaldehyde condensation and subsequent phosgenation, m- and p-isocyanatophenylsulfonyl isocyanates, perchlorinated arylpolyisocyanates, polyisocyanates comprising carbodiimide groups, polyisocyanates comprising allophanate groups, polyisocyanates comprising isocyanurate groups, polyisocyanates comprising urethane groups, polyisocyanates comprising acylated urea groups, polyisocyanates comprising biuret groups, polyisocyanates comprising ester groups, reaction products of the above-mentioned isocyanates with acetals, and polyisocyanates comprising polymeric fatty acid radicals.

It is also possible to use the distillation residues comprising isocyanate groups that are obtained in the course of the industrial production of isocyanates, optionally dissolved in one or more of the above-mentioned polyisocyanates. It is also possible to use any desired mixtures of the above-mentioned polyisocyanates.

Special preference is generally given to polyisocyanates that are readily accessible industrially, for example 2,4- and 2,6-tolylene diisocyanate and any desired mixtures of those isomers ("TDI"), polyphenyl-polymethylene polyisocyanates, such as are prepared by aniline-formaldehyde condensation and subsequent phosgenation ("crude MDI"), and polyisocyanates comprising carbodiimide groups, urethane groups, allophanate groups, isocyanurate groups, urea groups or biuret groups ("modified polyisocyanates").

Components b) to be used according to the invention are compounds comprising at least two hydrogen atoms that are reactive towards isocyanates and having a molecular weight generally of from 400 to 10,000. In addition to compounds comprising amino, thiol or carboxy groups, these are preferably understood as being polyhydroxy compounds, especially compounds comprising from two to eight hydroxy groups, especially those having a molecular weight of from 800 to 10 000, preferably from 1000 to 6000, for example polyesters, polyethers, polythioethers, polyacetals, polycarbonates and polyester amides comprising at least two, generally from 2 to 8, and preferably from 2 to 4, hydroxy groups, such as are known per se for the preparation of homogeneous and cellular polyurethanes.

Suitable polyesters comprising hydroxy groups are, for example, reaction products of polyhydric, preferably dihydric and optionally, in addition, trihydric alcohols, with polybasic, preferably dibasic, carboxylic acids. Instead of the free polycarboxylic acids it is possible to use for the preparation of the polyesters the corresponding polycarboxylic acid anhydrides or corresponding polycarboxylic acid esters of lower alcohols, or mixtures thereof. The polycarboxylic acids may be aliphatic, cycloaliphatic, aromatic and/or heterocyclic and unsubstituted or substituted, for example by halogen atoms, and/or unsaturated.

Examples thereof that may be mentioned are: succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylenetetrahydrophthalic acid anhydride, glutaric acid anhydride, maleic acid, maleic acid anhydride, fumaric acid, dimeric and trimeric fatty acids, such as oleic acid, optionally in admixture with monomeric fatty acids, terephthalic acid dimethyl ester and terephthalic acid bisglycol ester. Suitable polyhydric alcohols are, for example, ethylene glycol, propylene glycol-(1,2) and -(1,3), butylene glycol-(1,4) and -(2,3), hexanediol-(1,6), octanediol-(1,8), neopentyl glycol, cyclohexanedimethanol(1,4-bishydroxymethylcyclohexane), 2-methyl-1,3-propanediol, glycerol, trimethylolpropane, hexanetriol-(1,2,6), butanetriol-(1,2,4), trimethylolethane, pentaerythritol, quinitol, mannitol and sorbitol, methylglycoside, also diethylene glycol, triethylene glycol, tetraethylene glycol, polyethylene glycols, dipropylene glycol, polypropylene glycols, dibutylene glycol and polybutylene glycols. Polyesters may have a proportion of terminal carboxy groups. Polyesters of lactones, for example ε-caprolactone or of hydroxycarboxylic acids, for example ω-hydroxycaproic acid, may also be used.

The polyethers comprising at least two, generally from two to eight, preferably two or three, hydroxy groups that are suitable according to the invention are also of the type known per se and are prepared, for example, by polymerisation of epoxides, such as ethylene oxide, propylene oxide, butylene oxide, tetrahydrofuran, styrene oxide or epichlorohydrin, with themselves, for example in the presence of $BF_3$, or by addition of those epoxides, optionally as a mixture or one after another, to starting components having reactive hydrogen atoms, such as water, alcohols, ammonia or amines, for example ethylene glycol, propylene glycol-(1,3) and -(1,2), trimethylolpropane, 4,4'-dihydroxydiphenylpropane, aniline, ethanolamine or ethylenediamine. Sucrose polyethers are also suitable according to the invention. In many cases, preference is given to polyethers having predominantly (up to 90% by weight, based on all the OH groups present in the polyether) primary OH groups. Also suitable are polyethers modified by vinyl polymers, such as those formed, for example, by polymerisation of styrene and acrylonitrile in the presence of polyethers, and polybutadienes comprising OH groups.

Of the polythio ethers, special mention is to be made of the condensation products of thiodiglycol with itself and/or with other glycols, dicarboxylic acids, formaldehyde, aminocarboxylic acids or amino alcohols. Depending on the co-components, the products are polythio mixed ethers, polythio ether esters or polythio ether ester amides.

Suitable polyacetals are, for example, the compounds that can be prepared from glycols, such as diethylene glycol, triethylene glycol, 4,4'-dioxoethoxydiphenyl-dimethylmethane, hexanediol and formaldehyde. Polyacetals that are suitable according to the invention can also be prepared by polymerisation of cyclic acetals.

Suitable polycarbonates comprising hydroxy groups are those of the type known per se that can be prepared, for example, by reaction of diols, such as propanediol-(1,3), butanediol-(1,4) and/or hexanediol-(1,6), diethylene glycol, triethylene glycol or tetraethylene glycol, with diaryl carbonates, for example diphenyl carbonate, or phosgene.

The polyester amides and polyamides include, for example, the predominantly linear condensates obtained from polybasic saturated and unsaturated carboxylic acids and/or their anhydrides, and polyhydric saturated and unsaturated amino alcohols, diamines, polyamines and mixtures thereof.

Polyhydroxy compounds already comprising urethane or urea groups, and modified or unmodified natural polyols, such as castor oil, carbohydrates or starches, can also be used. Addition products of alkylene oxides with phenol-formaldehyde resins or with urea-formaldehyde resins can also be used according to the invention. It is, of course, possible to use mixtures of the above-mentioned compounds comprising at least two hydrogen atoms that are reactive towards isocyanates, especially those having a molecular weight of from 400 to 10 000, for example mixtures of polyethers and polyesters.

Components b) to be used according to the invention-optionally in admixture with the mentioned higher molecular weight compounds-include compounds comprising at least two hydrogen atoms that are reactive towards isocyanates and having a low molecular weight, for example from 32 to 400. In that case also there are understood thereby compounds comprising hydroxy groups and/or amino groups and/or thiol groups and/or carboxy groups, preferably compounds comprising hydroxy groups and/or amino groups, which serve as chain-lengthening agents or cross-linking agents. Those compounds generally comprise from 2 to 8 hydrogen atoms that are reactive towards isocyanates, preferably 2 or 3 reactive hydrogen atoms.

Examples of such compounds that may be mentioned are: ethylene glycol, propylene glycol-(1,2) and-(1,3), butylene glycol-(1,4) and-(2,3), pentanediol-(1,5), hexanediol-(1,6), octanediol-(1,8), neopentyl glycol, 1,4-bishydroxymethyl-cyclohexane, 2-methyl-1,3-propanediol, glycerol, trimethylolpropane, hexanetriol-(1,2,6), trimethylolethane, pentaerythritol, quinitol, mannitol, sorbitol, diethylene glycol, triethylene glycol, tetraethylene glycol, polyethylene glycols having a molecular weight of up to 400, dipropylene glycol, polypropylene glycols having a molecular weight of up to 400, dibutylene glycol, polybutylene glycols having a molecular weight of up to 400, 4,4'-dihydroxydiphenyl-propane, dihydroxymethyl-hydroquinone, ethanolamine, diethanolamine, triethanolamine, 3-aminopropanol, ethylenediamine, 1,3-diaminopropane, 1-mercapto-3-aminopropane, 4-hydroxy- or 4-amino-phthalic acid, succinic acid, adipic acid, hydrazine, N,N'-dimethylhydrazine, 4,4'-diaminodiphenylmethane, tolylene diamine, methylene-bischloroaniline, methylene-bisan-thranilic acid ester, diaminobenzoic acid ester and the isomeric chlorophenylenediamines.

It is possible in this case also to use mixtures of different compounds comprising at least two hydrogen atoms that are reactive towards isocyanates and having a molecular weight of from 32 to 400.

Polyhydroxy compounds that are preferred according to the invention are branched or linear polyesters comprising hydroxy groups, such as condensates of adipic acid and phthalic acid with an excess of diols and triols of diols, and polyacetals, polyethers, such as polytetrahydrofuran, and polythio ether adiprenes.

The catalysts (component c) used are catalysts that are known per se, such as tertiary amines, such as triethylamine, tributylamine, N-methyl-morpholine, N-ethyl-morpholine, N-cocomorpholine, N,N,N',N'-tetramethyl-ethylenediamine, 1,4-diazabicyclo-(2,2,2)-octane, N-methyl-N'-dimethylaminoethyl-piperazine, N,N-dimethylbenzylamine, bis(N,N-diethylaminoethyl) adipate, N,N-diethylbenzylamine, pentamethyldiethylenetriamine, N,N-dimethylcyclohexylamine, N,N,N',N'-tetramethyl-1,3-butanediamine, N,N-dimethyl-β-phenylethylamine, 1,2-dimethylimidazole and 2-methylimidazole, also Mannich bases known per se formed from secondary amines, such as dimethylamine, and aldehydes, preferably formaldehyde, or ketones, such as acetone, methyl ethyl ketone or cyclohexanone, and phenols, such as phenol, nonylphenol or bisphenol.

Examples of tertiary amines comprising hydrogen atoms active towards isocyanate groups that may be used as catalysts are triethanolamine, triisopropanolamine, N-methyldiethanolamine, N-ethyl-diethanolamine, N,N-dimethyl-ethanolamine, and reaction products thereof with alkylene oxides, such as propylene oxide and/or ethylene oxide.

Further suitable catalysts are silaamines having carbon-silicon bonds, such as 2,2,4-trimethyl-2-silamorpholine and 1,3-diethylaminomethyl-tetramethyl-disiloxane, and nitrogen-containing bases, such as tetraalkylammonium hydroxides, and alkali metal hydroxides, such as sodium hydroxide, alkali metal phenolates, such as sodium phenolate, or alkali metal alcoholates, such as sodium methoxide, or hexahydrotriazines, and organometallic compounds, especially organotin compounds, for example tin(II) salts of carboxylic acid, such as tin(II) acetate, tin(II) octoate, tin(II) ethylhexoate and tin(II) laurate, and the tin(IV) compounds, for example dibutyltin oxide, dibutyltin dichloride, dibutyltin diacetate, dibutyltin dilaurate, dibutyltin maleate or dioctyltin diacetate. It is, of course, possible for all of the above-mentioned catalysts to be used in the form of mixtures.

The process according to the invention is used preferably for the preparation of polyurethane foams, advantageously using blowing agents.

Blowing agents that may be used concomitantly according to the invention are water and/or readily volatile organic substances. Examples of suitable organic blowing agents are acetone, ethyl acetate, halogen-substituted alkanes, such as methylene chloride, chloroform, ethylidene chloride, vinylidene chloride, monofluorotrichloromethane, chlorodifluoromethane, dichlorodifluoromethane, and butane, hexane, heptane and diethyl ether. A blowing effect can be achieved also by the addition of compounds that decompose at temperatures above room temperature with evolution of gases, for example of nitrogen, for example azo compounds, such as azoisobutyric acid nitrile.

According to the invention, other additives known per se, for example surface-active additives, such as emulsifiers and foam stabilisers, may optionally be used concomitantly.

Examples of suitable emulsifiers are the sodium salts of ricinoleic sulfonates or salts of fatty acids with amines, such as diethylamine oleate or diethanolamine stearate. Alkali metal or ammonium salts of sulfonic acids, for example of dodecylbenzenesulfonic acid or dinaphthylmethanedisulfonic acid, or of fatty acids, such as ricinoleic acid, or of polymeric fatty acids, may also be used concomitantly as surface-active additives.

Suitable foam stabilisers are especially polyether siloxanes, especially water-soluble representatives thereof. The structure of those compounds is generally such that a copolymer of ethylene oxide and propylene oxide is bonded to a polydimethylsiloxane radical.

Further additives that may be used concomitantly are reaction retardants, for example substances with an acid reaction, such as hydrochloric acid or organic acid halides, also cell regulators of the type known per se, such as paraffins or fatty alcohols, or dimethylpolysiloxanes and pigments or dyes and flame-retardants of the type known per se, for example trischloroethyl phosphate, tricresyl phosphate or ammonium phosphate and polyphosphate, and stabilisers that counteract the effects of ageing and weathering, plasticisers and fungistats and bacteriostats, as well as fillers, such as barium sulfate, diatomaceous earth, carbon black or prepared chalk.

Further examples of surface-active additives and foam stabilisers as well as cell regulators, reaction retardants, stabilisers, flame-retardants, plasticisers, dyes and fillers as well as fungistats and bacteriostats that are optionally to be used concomitantly according to the invention, and details of the method of use and mode of action of those additives are well known to a person skilled in the art.

Using the process according to the invention, it is possible to prepare polyurethane substances in any desired form, such as articles of any desired form and also fibres. Preference is given, however, to the preparation of foams, it being possible, by suitable selection of the components, to obtain either flexible or rigid foams or any products between those extremes.

Polyurethane foams are preferably prepared from liquid starting components, the starting materials to be reacted with one another either being mixed together in a one-shot process, or a preadduct containing NCO groups that is formed from a polyol and an excess of polyisocyanate being prepared first and then foamed, for example by reaction with water.

According to the invention, the reaction components are reacted in accordance with the one-shot process known per se, by the prepolymer process or by the semi-prepolymer process, mechanical devices that are well known to a person skilled in the art often being used.

In the preparation of foams, the foaming is often carried out in moulds. In that case, the reaction mixture is introduced into a mould. Suitable mould materials are metals, for example aluminium, or plastics, for example epoxy resin. In the mould the foamable reaction mixture foams up and forms the moulded article. The formation of foam using a mould can be carried out in such a manner that the moulding has a cellular surface structure, or, alternatively, it can be carried out in such a manner that the moulding has a dense skin and a cellular core. In this connection, it is possible to introduce into the mould an amount of foamable reaction mixture such that the foam that is formed just fills the mould. It is, however, also possible to introduce more foamable reaction mixture into the mould than is required to fill the interior of the mould with foam. In the last-mentioned case, therefore, the operation being carried out is "overcharging".

In the case of foam formation in a mould "external release agents" known per se, such as silicone oils, are often used concomitantly. It is, however, also possible to use so-called "internal release agents", optionally in admixture with external release agents.

It is also possible according to the invention to use cold-hardening foams.

It is, of course, possible alternatively to prepare foams by means of block foaming or by means of the double conveyor belt process.

The process according to the invention can be used to prepare flexible, semi-flexible or hard polyurethane foams. They have the uses known per se for such products, for example as mattresses and upholstery in the furniture and automobile industries, and also for the manufacture of fittings, such as are used in the automobile industry, and finally as insulating compositions and as compositions for heat-insulation and low-temperature insulation, for example in the construction sector or in the refrigeration industry, or in the textile industry, for example as shoulder pads.

The stabiliser systems according to the invention have several advantages: liquid mixtures can be prepared without difficulty, allowing simple and rapid metering into component b). In contrast to the anti-oxidant 2,6-di-tert-butyl-4-methylphenol that is often used, such mixtures are markedly less volatile and have better resistance to migration, gas fading and storage yellowing. Moreover, they are excellent anti-oxidants in that they prevent discolouration in the preparation of polyurethanes.

In addition, they provide component b), which is susceptible to oxidation, especially the polyols preferably used as that component, with excellent protection against oxidative degradation, and can therefore be used as anti-oxidants for stabilising that component even before it is used in the process according to the invention, for example before or during the distillation process, which customarily follows the preparation of the polyols, or when it is being stored. The present invention relates also to this use.

The Examples that follow serve to illustrate the invention in more detail. Percentages and parts given in the Examples are percentages and parts by weight.

EXAMPLES 1-3 (soft polyether-polyurethane foams and the stabilisation thereof)

Exactly 470 mg (0.3%, based on the polyol) of a stabiliser mixture A, B, C, D or E according to the invention are dissolved in 157 g of an anti-oxidant-free polyether-polyol (trifunctional polyether-polyol having primary hydroxy groups; hydroxy number 35 mg KOH/g, water content less than 0.1%, acid number less than 0.1 mg KOH/g). (The stabiliser mixtures A, B, C, D and E are defined in Table 2). 10.24 g of a solution of 1.74 g of ®TECOSTAB [polysilicone produced by Goldschmidt, DE], 0.48 g of diazabicyclo-octane [amine catalyst] and 0.8 g of water are added thereto and the reaction mixture is stirred intensively at 100 rpm for 60 seconds.

3.2 g of a solution of 0.32 g of tin octoate (catalyst) in 2.9 g of the above polyol are then added thereto and the reaction mixture is again stirred intensively for 60 seconds at 100 rpm. Immediately, while stirring intensively, 98 g of an isocyanate (®Lupranol T80 produced by Bayer; tolylene 2,4- and -2,6-diisocyanate mixture) are added thereto and after 6 seconds the reaction mixture is poured into a lined mould and the exothermic temperature is measured during foaming to form a foam block.

The foam blocks are cooled for 24 hours in a climatic chamber at 5° C. and stored. Slices 2 cm thick are sawed from the middle of the blocks and round (cylindrical) test samples are cut therefrom using a boring tool. The samples are aged in a test tube in the presence of air at 190° C. in a preheated alu-block thermostat.

The yellowing of those samples is determined as the Yellowness Index (YI) in accordance with ASTM 1925.

The resistance of the stabilised polyether-polyol to oxidation is determined by measuring the DSC value (differential scanning calorimetry, temperature-controlled calorimetry). For that purpose, 20 mg of the polyol are weighed into an aluminium crucible and heated from a starting temperature of 50° C. at a rate of 5° C./min. The beginning of the exothermic oxidation is determined calorimetrically by means of a temperature-controlled measurement against an unstabilised reference substance. The temperature at which oxidation begins, and the temperature difference ($\Delta T$) between the temperature measured for the respective stabilised samples and the corresponding temperature of the unstabilised polyol are given. High values denote a high degree of resistance to oxidation.

The results are summarised in Table 1 below.

Even after 180 minutes the samples tested exhibit excellent YI values (low values denote a low degree of yellowing) and very good oxidation-resistance values.

TABLE 1

| Ex. No. | Stabiliser mixture | Conc. in %, based on polyol | YI after oven ageing | | | | | | | | | Oxidation-resistance acc. to DSC method | |
|---|---|---|---|---|---|---|---|---|---|---|---|---|---|
| | | | 0 | 10 | 20 | 30 | 40 | 60 | 90 | 120 | 180 (min.) | T (°C.) | $\Delta T$ |
| 1 | A | 0.3 | −0.9 | 1.0 | 0.9 | 1.6 | 2.4 | 2.9 | 3.7 | 8.0 | 25 | 171 | 43 |
| 2 | B | 0.3 | −0.8 | 1.4 | 1.4 | 1.5 | 2.5 | 3.5 | 4.7 | 7.4 | 23 | 177 | 49 |
| 3 | C | 0.3 | −0.9 | 1.7 | 1.4 | 1.9 | 2.7 | 4.7 | 9.3 | 23 | | 164 | 36 |
| 4 | D | 0.3 | −0.8 | — | 0.8 | 1.1 | 1.6 | 2.3 | 3.0 | 5.8 | 12 | 174 | 46 |
| 5 | E | 0.3 | −0.7 | — | 1.4 | 1.5 | 2.6 | 3.5 | 4.7 | 8.7 | 23 | 177 | 49 |
| 6 | no stabiliser | — | −0.2 | 43 | 54 | | | | | | | 128 | — |

TABLE 2

| | Definition of mixtures A, B, C, D and E: |
|---|---|
| Stabiliser mixture No. | |
| | 1:1 mixtures (in % by wt) of compounds of formulae |
| A | formula 1a $\begin{cases} R_1 = -CH_3 \\ R_3 = -H \\ R_2 = n\text{-}C_8H_{17} \end{cases}$ formula 2 $\begin{cases} n = 1 \\ R_6 = \text{tert-butyl} \\ R_7 = H \\ R_8 = CH_3 \end{cases}$ |
| B | formula 1a, as A 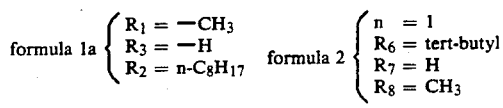 formula 4 Ar = Ar' = mixture of isomers* |
| C | formula 1a, as A 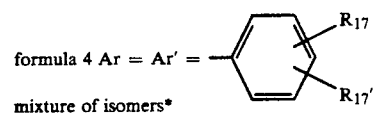 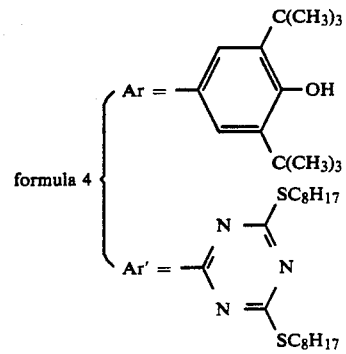 formula 4 |
| | 4:1 mixtures (in % by wt.) of compounds of formulae |
| D | formula 1a, as A    formula 2, as A |

TABLE 2-continued

Definition of mixtures A, B, C, D and E:

Stabiliser mixture No.

E    formula 1a, as A formula 4 Ar = Ar' = 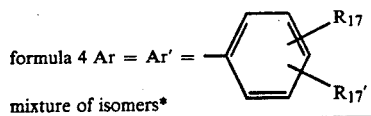

mixture of isomers*

*Industrial mixture obtained by reaction of diphenylamine with diisobutylene, comprising 3.2% diphenylamine, 13.2% mono-t-butyldiphenylamine, 25.3% mono-t-octyldiphenylamine and di-t-butyldiphenylamine, 24.2% t-butyl-t-octyldiphenylamine, 24.3% di-t-octyldiphenylamine and other higher alkylated diphenylamines, the content of 4,4'-di-t-octyldiphenylamine being 18.2% and further smaller amounts of diphenylamines with partially modified side chains and polymers to 100%

What is claimed is:

1. A process for the preparation of polyurethane substances by reaction of
   a) polyisocyanates with
   b) compounds comprising at least two hydrogen atoms that are reactive towards isocyanates, in the presence of
   c) catalysts known per se and
   d) specific stabiliser systems, wherein there is used as component d) a stabiliser system comprising at least two compounds of at least two structurally different stabiliser types of formulae (1), (2), (3) and (4), in which formula (1) represents formulae (1a), (1b), (1c), (1d) or (1e)

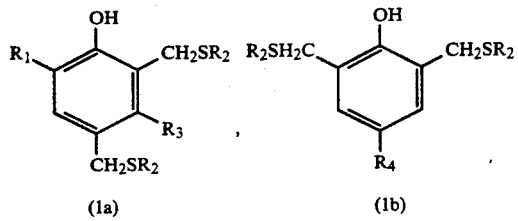

(1a)      (1b)

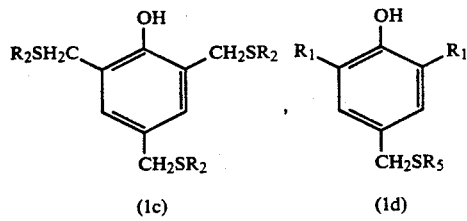

(1c)      (1d)

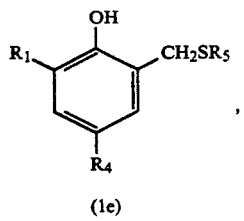

(1e)

and the other formulae (2), (3) and (4) are as follows:

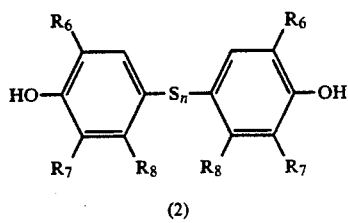

(2)

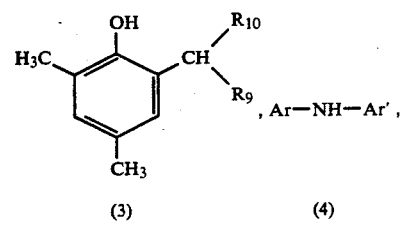

(3)      (4)

wherein
$R_1$ each independently of the other is $C_1$–$C_4$alkyl, $R_2$ and $R_5$ each independently of the other are $C_1$–$C_{18}$alkyl, $C_5$–$C_7$cycloalkyl, benzyl, phenyl or a group of the formula —$CH_2COO$-$C_6$–$C_{18}$alkyl, $R_3$ is —H or —$CH_3$, and $R_4$ is $C_1$–$C_{12}$alkyl, $R_6$ and $R_8$ each independently of the other are $C_1$–$C_{18}$alkyl or $C_5$–$C_7$cycloalkyl, $R_7$ each independently of the other is —H, $C_1$–$C_4$alkyl or $C_5$–$C_7$cycloalkyl, n is the number 1, 2 or 3, $R_9$ is $C_6$–$C_{18}$alkyl and $R_{10}$ is methyl or ethyl, and Ar and Ar' each independently of the other are a radical of the formula

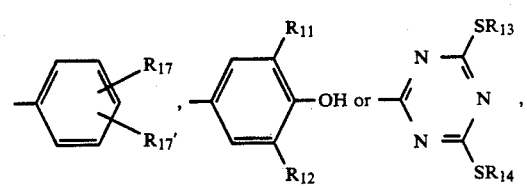

or Ar—NH—Ar' is a radical of the formula

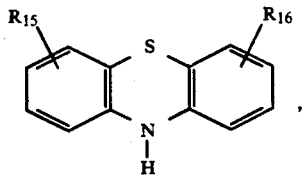

wherein $R_{17}$ and $R_{17}'$ each independently of the other are —H or $C_4$–$C_{18}$alkyl, $R_{11}$ and $R_{12}$ each independently of the other are $C_1$–$C_4$alkyl, $R_{13}$ and $R_{14}$ each independently of the other are $C_4$–$C_{18}$alkyl, and $R_{15}$ and $R_{16}$ each independently of the other are —H or $C_1$–$C_{12}$alkyl.

2. A process as claimed in claim 1 wherein in formula 1a $R_1$ is —$CH_3$ or tert-butyl, $R_2$ is octyl and $R_3$ is —H or —$CH_3$.

3. A process as claimed in claim 2 wherein $R_1$ is —$CH_3$, $R_3$ is —H and $R_2$ is octyl.

4. A process as claimed in claim 1 wherein in formula 1b $R_2$ is straight-chain or branched $C_8$–$C_{12}$alkyl and $R_4$ is straight-chain or branched nonyl.

5. A process as claimed in claim 1 wherein in formula 1c $R_2$ is straight-chain or branched $C_8$–$C_{12}$alkyl.

6. A process as claimed in claim 1 wherein in formula 1d $R_1$ is tert-butyl and $R_5$ is straight-chain or branched octyl.

7. A process as claimed in claim 1 wherein in formula 2 the two radicals $R_6$ are identical and are $C_1$–$C_4$alkyl, $R_7$ is —H, $R_8$ is —CH$_3$ and n is the number 1.

8. A process as claimed in claim 1 wherein in formula 3 $R_9$ is straight-chain or branched $C_{14}$alkyl or $C_{16}$alkyl.

9. A process as claimed in claim 1 wherein formula 4 corresponds to the following formulae.

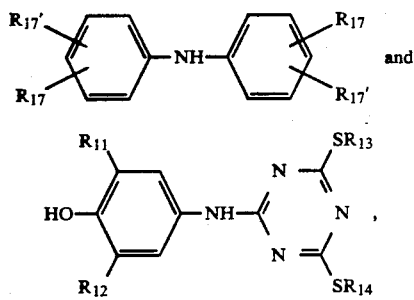

wherein $R_{17}$ and $R_{17}'$ are identical or different and are $C_4$–$C_8$alkyl, $R_{11}$ and $R_{12}$ are tert-butyl and $R_{13}$ and $R_{14}$ are straight-chain or branched octyl.

10. A process as claimed in claim 1 wherein the stabiliser system comprises at least two compounds of two stabiliser types of formulae 1a and 2, 1a and 4, or 2 and 4.

11. A process as claimed in claim 1 wherein the stabiliser system is liquid.

12. A process as claimed in claim 1 wherein there is used as polyisocyanate 2,4- or 2,6-tolylene diisocyanate or a mixture of those isomers ("TDI"), a polyphenyl-polymethylene polyisocyanate, such as those prepared by aniline-formaldehyde condensation and subsequent phosgenation ("crude MDI"), or a polyisocyanate comprising carbodiimide groups, urethane groups, allophanate groups, isocyanurate groups, urea groups or biuret groups ("modified polyisocyanate").

13. A process as claimed in claim 1 wherein there is used as component b) a hydroxy-group-containing branched or linear polyester, polyacetal, polyether or polythioether adiprene.

14. A process as claimed in claim 1 in which a polyurethane foam is prepared.

15. A process as claimed in claim 1 wherein a blowing agent is added.

16. Method for stabilizing polyurethane substances or component b) as described in claim 1 during preparation by incorporating into said substances a stabilizer system as claimed in claim 1 (component d).

17. A stabilised composition comprising
  A) a polyurethane substance and
  B) a stabiliser system that comprises at least two compounds of at least two structurally different stabiliser types of formulae 1, 2, 3 and 4 as defined in claim 1.

* * * * *